US009541194B2

(12) United States Patent
Haruna et al.

(10) Patent No.: US 9,541,194 B2
(45) Date of Patent: Jan. 10, 2017

(54) CYLINDER DEVICE WITH FORCE MULTIPLIER

(71) Applicant: KOSMEK LTD., Hyogo (JP)

(72) Inventors: Yosuke Haruna, Hyogo (JP); Hideaki Yokota, Hyogo (JP)

(73) Assignee: KOSMEK LTD. (JP)

( * ) Notice: Subject to any disclaimer, the term of this patent is extended or adjusted under 35 U.S.C. 154(b) by 414 days.

(21) Appl. No.: 14/372,873

(22) PCT Filed: Feb. 12, 2013

(86) PCT No.: PCT/JP2013/053219
§ 371 (c)(1),
(2) Date: Jul. 17, 2014

(87) PCT Pub. No.: WO2013/122039
PCT Pub. Date: Aug. 22, 2013

(65) Prior Publication Data
US 2015/0000516 A1 Jan. 1, 2015

(30) Foreign Application Priority Data
Feb. 16, 2012 (JP) .................................. 2012-049765

(51) Int. Cl.
*B23Q 3/00* (2006.01)
*F16J 1/00* (2006.01)
(Continued)

(52) U.S. Cl.
CPC ................ *F16J 1/005* (2013.01); *B23Q 1/009* (2013.01); *B23Q 1/0081* (2013.01);
(Continued)

(58) Field of Classification Search
CPC . F15B 15/1457; F15B 15/1466; F15B 11/036; F15B 11/0365; F15B 15/204; F15B 15/1409; B25B 5/06; B25B 5/061; B25B 5/062; B23Q 1/0081; B23Q 1/009; B23Q 1/0072; F15J 1/005
(Continued)

(56) References Cited

U.S. PATENT DOCUMENTS 6,024,354 A * 2/2000 Yonezawa ............ B23Q 1/0081
269/309
6,527,266 B1 * 3/2003 Yonezawa ............ B23Q 1/0081
269/309
(Continued)

FOREIGN PATENT DOCUMENTS

| JP | 2007268625 | 10/2007 |
|---|---|---|
| JP | 2008116032 | 5/2008 |
| JP | 2009255219 | 5/2009 |

OTHER PUBLICATIONS

International Preliminary Report on Patentability of PCT/JP2013/053219 dated Aug. 28, 2014.
(Continued)

*Primary Examiner* — Michael Leslie
*Assistant Examiner* — Dustin T Nguyen
(74) *Attorney, Agent, or Firm* — Bacon & Thomas, PLLC (57) ABSTRACT

An output rod (27) is inserted in a housing (4) so as to be movable vertically. A first piston (41) inserted in a lower part of the housing (4) is fixed to the output rod (27). A second piston (42) inserted on an upper side of the first piston (41) is fitted on the output rod (27) so as to be movable vertically. A lock chamber (44) is provided between the first piston (41) and the second piston (42). A first release chamber (51) is provided below the first piston (41). A second release chamber (52) is provided above the second piston (42). During force multiplication driving of the output rod (27), a pressurized fluid in the lock chamber (44) carries out the force multiplication driving with respect to the output rod
(Continued)

(27) downward via the second piston (42) and engaging balls (69). A retaining spring (60) which biases the second piston (42) upward is provided in the lock chamber (44) between the first piston (41) and the second piston (42).

6 Claims, 4 Drawing Sheets

(51) Int. Cl.
  *B23Q 1/00* (2006.01)
  *F16J 10/02* (2006.01)
  *F15B 15/14* (2006.01)
  *F15B 15/20* (2006.01)

(52) U.S. Cl.
  CPC ........ *F15B 15/1409* (2013.01); *F15B 15/204* (2013.01); *F16J 10/02* (2013.01)

(58) Field of Classification Search
  USPC ........ 92/14, 15, 20, 22, 23, 29, 107; 269/24, 269/17, 309
  See application file for complete search history.

(56) References Cited

U.S. PATENT DOCUMENTS 8,590,878 B2 * 11/2013 Haruna ................. B23Q 1/009
  269/309
2006/0186591 A1 * 8/2006 Yonezawa .......... B23B 31/1071
  269/309

OTHER PUBLICATIONS

International Search Report of PCT/JP2013/053219 dated May 21, 2013.

* cited by examiner

CYLINDER DEVICE WITH FORCE MULTIPLIER

TECHNICAL FIELD

The present invention relates to a cylinder device having a force multiplier and, more specifically, to a technology suitable for strongly fixing an object to be fixed, such as a workpiece and a die, and retaining its fixed state.

BACKGROUND ART

Such a type of conventional cylinder device having a force multiplier is disclosed in Patent Literature 1 (Japanese Patent Application Publication, Tokukai, No. 2007-268625 A). The conventional technology is configured as follows:

A clamping rod, serving as an output rod, is inserted in a housing so as to be movable vertically. A first piston for rod is inserted in an upper part of the housing, and is fixed to the clamping rod. A first lock chamber and a first release chamber are formed above and below the first piston, respectively. A second piston for force multiplication is inserted in a lower part of the housing, and is fitted on the clamping rod so as to be movable vertically. A second lock chamber and a second release chamber are formed above and below the second piston, respectively.

By supply of compressed air in the first lock chamber and the second lock chamber, the second piston carries out force multiplication driving downward with respect to the clamping rod via a force multiplier.

Conventionally, the force multiplier includes: an engagement groove provided in a lower portion of the clamping rod; and a plurality of claw members swingably supported by the lower part of the housing. During the force multiplication driving, a tapered surface of the second piston, which has been driven downward, causes the claw members to swing inward in a radial direction, so that the claw members engage with the engagement groove.

CITATION LIST

Patent Literature 1
Japanese Patent Application Publication, Tokukai, No. 2007-268625 A (Publication date: Oct. 18, 2007)

SUMMARY OF INVENTION

Technical Problem

The conventional technology has the following problems:
During the force multiplication driving, the second piston, which has been driven downward, carries out the force multiplication driving with respect to the clamping rod via the claw members and the engagement groove. Therefore, a great reaction force, generated during the force multiplication driving, acts upward from the engagement groove to the claw members, so that the claw members are strongly pulled upward. This requires a robust structure in which the claw members are swingably supported by the housing. Such a support structure is big and results in a bulky cylinder device.

Further, the conventional technology requires compartmentalization of the first release chamber formed below the first piston and the second lock chamber formed above the second piston, thus requiring a thick partition wall to be provided at a certain height of the housing. Such a housing is tall and results in an even bulkier cylinder device.

An object of the present invention is to provide a small-sized cylinder device having a force multiplier.

Solution to Problem

In order to attain the above object, a cylinder device having a force multiplier of the present invention is configured as below (see, for example, FIGS. 1A through 3A (or FIG. 4) or FIG. 5).

That is, the cylinder device is configured so as to carry out lock driving downward with respect to an output rod 27 that is inserted in a housing 4 so as to be movable vertically. A first piston 41 is inserted in a lower part of a cylinder hole 34 formed in the housing 4, and is connected to a bottom of the output rod 27. A second piston 42 is inserted in an upper part of the cylinder hole 34, and is fitted on the output rod 27 so as to be movable vertically. A lock chamber 44 is provided between the first piston 41 and the second piston 42, and a pressurized fluid is supplied into or discharged from the lock chamber 44. A first release chamber 51 is provided below the first piston 41, and a pressurized fluid is supplied into or discharged from the first release chamber 51. A second release chamber 52 is provided above the second piston 42, and a pressurized fluid is supplied into and discharged from the second release chamber 52. A force multiplier 64 is provided in the second release chamber 52 so that (i) a force, which causes a pressurized fluid supplied into the lock chamber 44 to push the second piston 42 upward, is converted into a downward force while being subjected to force multiplication and (ii) the downward force thus converted is transmitted to the output rod 27. The force multiplier 64 includes (i) a force-multiplying portion 70 provided on the second piston 42 and (ii) a plurality of engaging balls 69 which are provided in a circumferential direction at predetermined intervals and with respect to which the force-multiplying portion 70 carries out wedged-driving inward in a radial direction. A retaining spring 60 which biases the second piston 42 upward is provided in the lock chamber 44 between the first piston 41 and the second piston 42.

BRIEF DESCRIPTION OF DRAWINGS

FIG. 3 B is a view similar to FIG. 1B.

DESCRIPTION OF EMBODIMENTS

FIGS. 1A through 3B each illustrate Embodiment 1 of the present invention.

Embodiment 1 takes, as an example, a case where the present invention is applied to a clamping system of a work pallet.

Figure 1A:
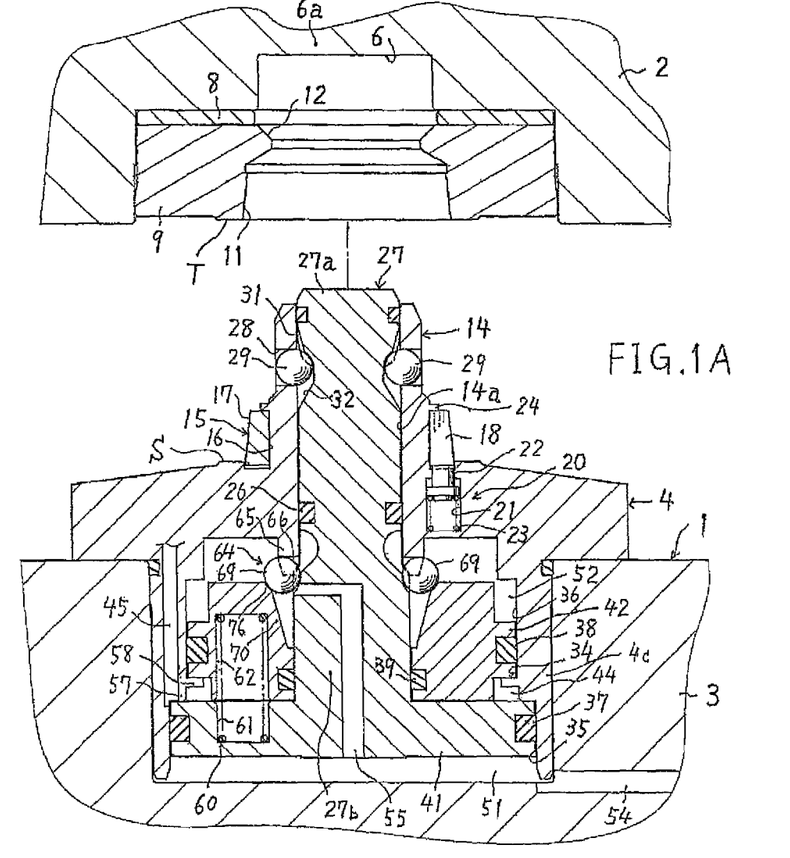
FIG. 1A is an elevational cross-sectional view of a clamping system, in a separated state, which employs a cylinder device having a force multiplier according to Embodiment 1 of the present invention.
Figure 1B:
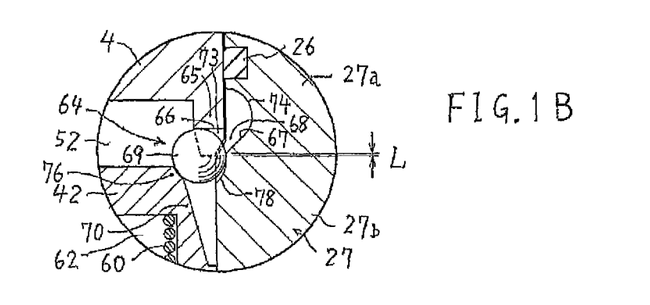
FIG. 1B is an enlarged view of a main part of FIG. 1A.

The following description will first discuss a whole configuration of such a clamping system with reference to FIGS. 1A and 1B.

A work pallet 2 serving as a movable block is carried in above a clamping pallet 1 serving as a reference block. The work pallet 2 is configured such that a plurality of workpieces (not illustrated) can be attached to or detached from an upper surface of the work pallet 2 by another clamping device (not illustrated).

The clamping pallet 1 includes a base plate 3 and a housing 4 which is fixed to the base palate 3 with the use of a plurality of bolts (not illustrated).

A shim member 8 and a ring member 9 are inserted in a lower part of a depression 6 of the work pallet 2, and are fixed to the work pallet 2 with the use of a plurality of bolts (not illustrated). A tapered hole 11 for positioning and an engaged portion 12 for clamping are formed, in this order from the bottom of the ring member 9, in the ring member 9. An inner periphery part of the ring member 9 protrudes downward so as to provide an annularly protruding part. A lower surface of the annularly protruding part serves as a supported surface T (see FIGS. 2 and 3A).

Figure 2:
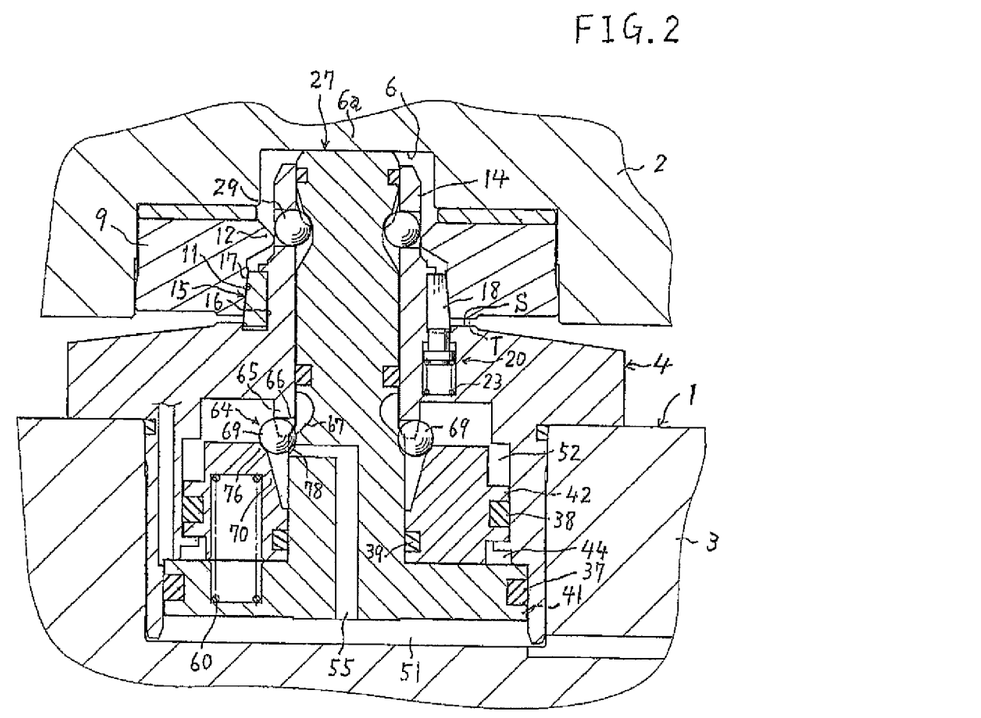
FIG. 2, which is similar to FIG. 1A, illustrates a release state of the clamping system.

An annular plug part 14 integrally protrudes upward from the housing 4 so as to be inserted into the ring member 9 of the work pallet 2 (see FIG. 2).

An outer surface of the housing 4 protrudes upward on an outer circumference side of a bottom of the plug part 14 so as to provide an annularly protruding part. An upper surface of the annularly protruding part serves as an annular supporting surface S (see FIGS. 2 and 3A).

A sleeve 15, which can expand or contract in a diametrical direction, is provided on an outer circumference of a lowered part of the plug part 14. A straight inner circumferential surface 16 of the sleeve 15 is supported by the outer circumferential surface of the plug part 14 so as to be movable vertically. A tapered outer circumferential surface 17 of the sleeve 15 is engageable with the tapered hole 11 of the work pallet 2. Here, a slit 18 is provided in part of a circumferential wall of the sleeve 15, so that the straight inner circumferential surface 16 and the tapered outer circumferential surface 17 can expand or contract in a diametrical direction. Note that, according to the present embodiment, the sleeve 15 is reduced in diameter by an external force acting on the tapered outer surface 17, whereas expanded in diameter by its elastic restoring force acting in a case where the application of the external force is removed.

There is provided advancing means 20 for pushing the sleeve 15 upward with a predetermined force. The advancing means 20 includes (i) a plurality of guide holes 21 (only one of which is illustrated in FIG. 1) formed in a circumferential direction at predetermined intervals on an inner side of the supporting surface S, (ii) a rod 22 inserted in each of the plurality of guide holes 21, and (iii) an advancing spring 23 which biases the rod 22 upward. An upper end surface of the rod 22 is in contact with a lower end surface of the sleeve 15. Note that a stopping part 24 of the plug part 14 prevents the sleeve 15 from moving upward a predetermined distance or more.

An upper rod part 27a of an output rod 27 is inserted into a cylindrical hole 14a of the plug part 14 via a sealing member 26 so as to be hermetically movable vertically. A plurality of through-holes 28 are formed, in the circumferential direction, at predetermined intervals in an upper part of a circumferential wall of the plug part 14. Lock balls 29 are supported in the respective plurality of through-holes 28 so as to be movable between an engagement release position (see FIGS. 1A and 2) inward in a radial direction and an engagement position outward in the radial direction (see FIG. 3A). Push surfaces 31 and retreat grooves 32 are provided one above the other on an upper part of an outer circumferential surface of the output rod 27 so as to correspond to the respective lock balls 29.

A cylinder hole 34 is formed in a lower half part of the housing 4. The cylinder hole 34 has (i) a large hole 35 formed in a lower part of the cylinder hole 34 and (ii) a small hole 36 formed in an upper part of the cylinder hole 34.

A first piston 41 is hermetically inserted in the large hole 35 via a sealing member 37, and is interconnected to a bottom of a lower rod part 27b of the output rod 27. Note that, according to the preset embodiment, the first piston 41 and the output rod 27 are integrally provided. Embodiment 1 is not limited to this. Alternatively, the first piston 41 and the output rod 27 can be provided separately.

An annular second piston 42 is hermetically inserted in the small hole 36 via an outer sealing member 38, and is fitted, via an inner sealing member 39, on the lower rod part 27b so as to be hermetically movable vertically. Note that the lower rod part 27b is formed so as to have a diameter slightly larger than that of the upper rod part 27a.

A lock chamber 44 is provided into which compressed air (pressurized fluid) is supplied or from which the compressed air is discharged, between the first piston 41 and the second piston 42. The lock chamber 44 is communicated with a lock port (not illustrated) via a lock supply and discharge passage 45.

A first release chamber 51 is provided into which compressed air is supplied or from which the compressed air is discharged, below the first piston 41. A second release chamber 52 is provided into which compressed air is supplied or from which the compressed air is discharged, above the second piston 42. The first release chamber 51 is communicated with a release port (not illustrated) via a release supply and discharge passage 54. The second release chamber 52 is communicated with the first release chamber 51 via a communicating passage 55 formed in the first piston 41 and the output rod 27.

In the lock chamber 44, a plurality of retaining springs 60 (only one of which is illustrated in FIG. 1A) are provided between the first piston 41 and the second piston 42. The plurality of retaining springs 60, each of which is made up of a compression coil spring, bias the second piston 42 upward against the first piston 41. More specifically, a plurality of first attachment holes 61 are formed, in the circumferential direction, at intervals on an upper surface of the first piston 41 so as to face the lock chamber 44. A plurality of second attachment holes 62 are formed, in the circumferential direction, at intervals on a lower surface of the second piston 42 so as to face the lock chamber 44. Each of the plurality of retaining springs 60 is inserted, vertically, in (i) a corresponding one of the plurality of first attachment holes 61 and (ii) a corresponding one of the end of a corresponding one of the plurality of retaining springs 60 is received by a bottom wall of a corresponding one of the plurality of first attachment holes 61, whereas an upper end of the corresponding one of the plurality of retaining springs 60 is received by a bottom wall of a corresponding one of the plurality of second attachment holes 62.

A force multiplier 64 is provided in the second release chamber 52. The force multiplier 64 is configured such that (i) a force, which causes the pressurized fluid supplied into the lock chamber 44 to push the second piston 42 upward, is converted into a downward force while being subjected to force multiplication and (ii) the downward force thus converted is transmitted to the output rod 27.

The force multiplier 64 is configured as below. A receiving cylinder 65 protrudes downward from an upper wall of the second release chamber 52. Wedge spaces 68 are formed between respective receiving portions 66 provided on the receiving cylinder 65 and respective transmitting parts 67 provided at a lower part of the upper rod part 27*a* so as to become narrower as they extends inward in a radial direction (see FIG. 3B). The wedge spaces 68 are formed, at predetermined intervals, in the circumferential direction. Engaging balls 69 are inserted into the respective wedge spaces 68. A force-multiplying portion 70 is provided on the second piston 42 so as to push the engaging balls 69 inward in the radial direction. More specifically, each of the above members is configured as below.

According to Embodiment 1, four transverse grooves 73 are formed, in the circumferential direction, on a lower part of the receiving cylinder 65. Each receiving portion 66 is made up of a bottom wall of a corresponding transverse groove 73. Furthermore, four depressions 74 are formed, in the circumferential direction, at substantially regular intervals on an outer circumferential surface at the lower part of the upper rod part 27*a* of the output rod 27. Bottom walls of the depressions 74 constitute the respective transmitting parts 67. Each of the transmitting parts 67 is inclined so as to become closer to an axis of the output rod 27 as it extends upward. The force-multiplying portion 70 is constituted by an inclined surface formed by an inner circumferential surface of the second piston 42. A press portion 76 (later described) is provided on an upper side of the force-multiplying portion 70. The press portion 76 has an arc-shaped surface in Embodiment 1.

According to the output rod 27, separate depressions 78 are provided on an upper part of the lower rod part 27*b*, on lower sides of the respective depressions 74 provided on the upper rod part 27*a* (see FIG. 1B). A straight line part L at an upper side of a bottom wall of each of the separate depressions 78 constitutes part of a low-load stroke region (later described).

The clamping system having the above configuration operates as below.

In a release state illustrated in FIGS. 1A and 1B (and FIG. 2), (i) compressed air is discharged from the lock chamber 44 and (ii) compressed air is supplied into the first release chamber 51 and the second release chamber 52. This causes the compressed air in the first release chamber 51 to push the first piston 41 upward, so that the first piston 41 is in contact with a step part 57 of the cylinder hole 34. Meanwhile, the compressed air in the second release chamber 52 pushes the second piston 42 downward, so that the second piston 42 is in contact with a stopper 58 of the cylinder hole 34. This allows a narrow gap (not illustrated) to be vertically formed between the press portion 76 of the second piston 42 and a corresponding engaging ball 69 (or between a corresponding receiving portion 66 and the corresponding engaging balls 69).

Since the first piston 41 raises the output rod 27, the lock balls 29 face the respective retreat grooves 32 and are movable to the engagement release position illustrated in the drawings. A biasing force of the advancing spring 23 keeps, via the rod 22, the sleeve 15 at a raised position.

As illustrated in FIG. 1A, the work pallet 2 is carried in above the cylinder device which is in the release state.

In a case where the work pallet 2 is positioned and fixed with respect to the clamping pallet 1, the work pallet 2 is first caused to move downward. This causes a top wall 6*a* of the depression 6 of the work pallet 2 to be in contact with an upper end surface of the output rod 27 so that the output rod 27 receives the work pallet 2 (see FIG. 2).

In a case where the cylinder device is subjected to lock driving, (i) the compressed air is discharged from the first release chamber 51 and the second release chamber 52 and (ii) compressed air is supplied into the lock chamber 44, in a release state illustrated in FIG. 2.

This causes the compressed air in the lock chamber 44 to push (i) the first piston 41 downward and (ii) the second piston 42 upward.

In an initial stage in the lock driving, the press portion 76 of the second piston 42 is received by the receiving portions 66 of the receiving cylinder 65 via the engaging balls 69. Meanwhile, the press portion 76 pushes the engaging balls 69 inward in the radial direction, i.e., toward the respective bottom walls of the separate depressions 78 of the output rod 27 so that the engaging balls 69 are in contact with the respective bottom walls. The compressed air in the lock chamber 44 causes the output rod 27 to move downward, via the first piston 41, against a low-load caused by factors such as (i) a frictional force due to the contact and/or (ii) a frictional force due to the sealing members 37, 38 and 39 (see, in FIG. 1B, the straight line part L which is part of the low-load stroke region).

In a case where the output rod 27 moves downward, the wedge spaces 68 are formed between the respective transmitting parts 67 provided on the output rod 27 and the respective receiving portions 66 provided on the receiving cylinder 65 (see FIG. 3B (later described)), and the press portion 76 pushes out the engaging balls 69 to the respective wedge spaces 68. It is now possible to start force multiplication driving.

In a case where a high-load (described later) is applied to the output rod 27, the force-multiplying portion 70 of the second piston 42 strongly pushes out the engaging balls 69 inward in the radial direction (see FIGS. 3A and 3B). This causes an upward thrust acting on the second piston 42 to be subjected to the force multiplication via the force-multiplying portion 70, the engaging balls 69, the receiving portions 66, and the transmitting parts 67. On this account, a downward thrust is generated, so that the output rod 27 is driven downward. Accordingly, a resultant force of (i) a downward force due to the force multiplier 64 and (ii) a downward force due to the first piston 41 causes the output rod 27 to be strongly driven downward (high-load stroke).

In a case where the cylinder device operates as described above, the work pallet 2 moves downward under its own weight, following the downward movement of the output rod 27. This causes the tapered hole 11 of the ring member 9 to be in contact with the tapered outer circumferential surface 17 of the sleeve 15. On this account, (i) the work pallet 2 slightly compresses, via the sleeve 15 and the rod 22, the advancing spring 23 and (ii) the tapered hole 11 is horizontally moved so that an axis of the tapered hole 11 is aligned with an axis of the plug part 14.

Almost simultaneously with this, the push surfaces 31 of the output rod 27 push the respective lock balls 29 toward the engagement position located outward in the radial direction. The pushing force exerting in the radial direction is converted into a downward force, via the engaged portion 12. The downward force thus converted causes the work pallet 2 to strongly move downward.

This causes the tapered hole 11 of the ring member 9 to be strongly taper-engaged with the tapered outer circumferential surface 17 of the sleeve 15. On this account, the sleeve 15 is reduced in diameter, so that (i) the axis of the tapered hole 11 is precisely aligned with the axis of the plug part 14 and (ii) the sleeve 15 further moves downward against biasing forces of the advancing spring 23. The supported surface T is thus received by the supporting surface S.

It follows that the work pallet 2 is (i) horizontally held by the plug part 14 via the tapered outer circumferential surface 17 of the sleeve 15 and (ii) vertically held by the supporting surface S. As a result, it is possible to precisely and strongly carry out positioning and fix the work pallet 2 with respect to the clamping pallet 1.

Figure 3A:
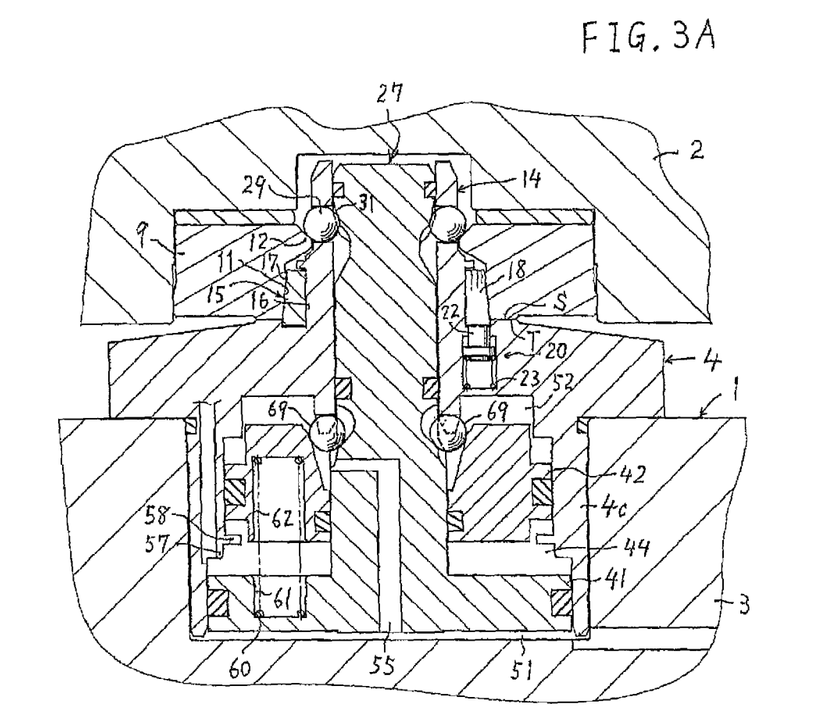
FIG. 3A, which is similar to FIG. 1A, illustrates a lock state of the clamping system.
Figure 3B:
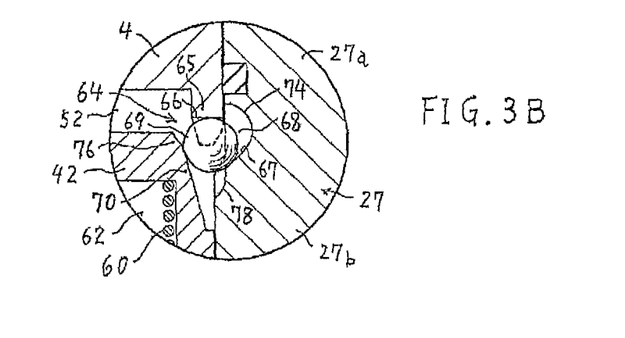

In a case where the cylinder device is switched from the lock state illustrated in FIG. 3A to the release state illustrated in FIG. 2, (i) the compressed air is discharged from the lock chamber 44 and (ii) compressed air is supplied into the first release chamber 51 and the second release chamber 52, in the locked state illustrated in FIG. 3A.

The compressed air in the second release chamber 52 first causes the second piston 42 to move downward with respect to the output rod 27 which has been prevented by engaging balls 69 from moving upward. The downward movement of the second piston 42 causes the engaging balls 69 to be changed to a state illustrated FIG. 2, and then the compressed air in the first release chamber 51 causes the output rod 27 to move upward via the first piston 41.

Note here that, since the first piston 41 is formed so as to have a large diameter, the first piston 41 strongly pushes the output rod 27 upward. This allows the upper end surface of the output rod 27 to strongly lift up the top wall 6a of the depression 6 of the work pallet 2. It is therefore possible to absolutely release the taper-engagement between the tapered hole 11 of the ring member 9 and the tapered outer circumferential surface 17 of the sleeve 15.

As a result, it is possible to smoothly remove the work pallet 2 from the clamping pallet 1 as illustrated in FIG. 1A.

During the force multiplication driving, an upward thrust acting on the second piston 42 is converted into a downward thrust via the force-multiplying portion 70, the engagement balls 69, the receiving portions 66, and the transmitting parts 67, and the downward thrust thus converted is transmitted to the output rod 27. Therefore, a great reaction force generated during the force multiplication driving acts, as a compressive force, from the output rod 27 onto the receiving cylinder 65 at an upper wall of the housing 4, via the engaging balls 69 and the receiving portions 66. Accordingly, the great reaction force generated during the force multiplication driving can be received with a simple structure in which the receiving cylinder 65 for receiving the compressive force is merely provided to the housing 4. This makes it possible to provide a small-sized cylinder device.

Note that, in the lock state illustrated in FIG. 3A, a retaining force caused by the force multiplier (a force preventing an external force acting on output rod 27 from releasing the lock state) is approximately 5 times to 10 times as strong as the "upward thrust acting on the second piston 42". This allows the lock state to be mechanically and strongly retained.

It should be noted that such mechanical retention of the lock state is maintained more effectively by biasing forces of the retaining springs 60. Specifically, the retaining springs 60 retain, in a wedge-engaged state, the engaging balls 69 which have been subjected to wedged-driving. This causes the lock state of the output rod 27 to be absolutely maintained. Even in a case where pressure in the lock chamber 44 disappears, it is therefore possible to maintain the lock state.

According to Embodiment 1, the retaining springs 60 are configured such that (i) the lower ends of the retaining springs 60 are received by the first piston 41 and (ii) the upper ends of the retaining springs 60 are received by the second piston 42. Alternatively, the retaining springs 60 can be arranged such that (i) the stopper 58 provided in the cylinder hole 34 is provided so as to protrude inward in the radial direction and (ii) the lower ends of the retaining springs 60 are received by the stopper 58 and the upper ends of the retaining springs 60 are received by the second piston 42. Note that each of the retaining springs 60 can be alternatively made up of other type of spring, such as a coned disc spring, instead of the compression coil spring illustrated. Such alternatives also apply to Embodiment 2 (later described).

Embodiment 1 can be further modified as below.

The sleeve 15 is not limited to the illustrated annular sleeve. Alternatively, the sleeve 15 can be configured so that a plurality of separate members are annularly arranged. Instead of the balls which engage with the engaged portion 12 made up of the illustrated tapered hole, the engagement member of the clamping device can be a collet which engages with a straight engaging hole with a frictional force or a plastic deformation force.

Examples of a shape of each depression 74 constituting a corresponding transmitting part 67 and examples of a shape of each transverse groove 73 constituting a corresponding receiving portion 66 include an arc-shaped groove, a U-shaped groove, and a Gothic arch-shaped groove. In this regard, the same applies to Embodiment 2.

The reference block can be a table of a machining center or a table of various types of machines, instead of the illustrated clamping pallet 1. The movable block can be a workpiece, instead of the work pallet 2.

The reference block and the movable block can be alternatively arranged upside down. The reference block and the movable block can be alternatively connected to each other horizontally or obliquely, instead of being connected to each other vertically. Such alternatives apply to Embodiment 2.

Figure 4:
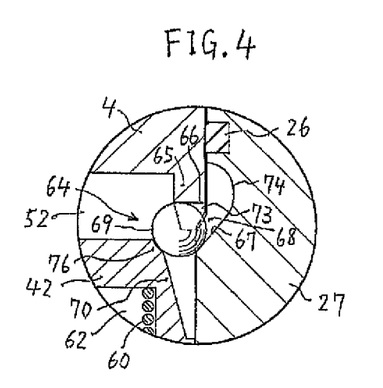
FIG. 4, which is similar to FIG. 1B, illustrates a modification of Embodiment 1.

FIG. 4 is a view, similar to FIG. 1B, illustrating a modification of Embodiment 1.

Note that the separate depressions 78 illustrated in FIG. 1B are omitted in FIG. 4. This allows a reduction in or an elimination of the low-load stroke region in the cylinder device.

Note that the output rod 27 can be arranged to be subjected to strong force multiplication driving from the initial stage in the lock driving process.

Figure 5:
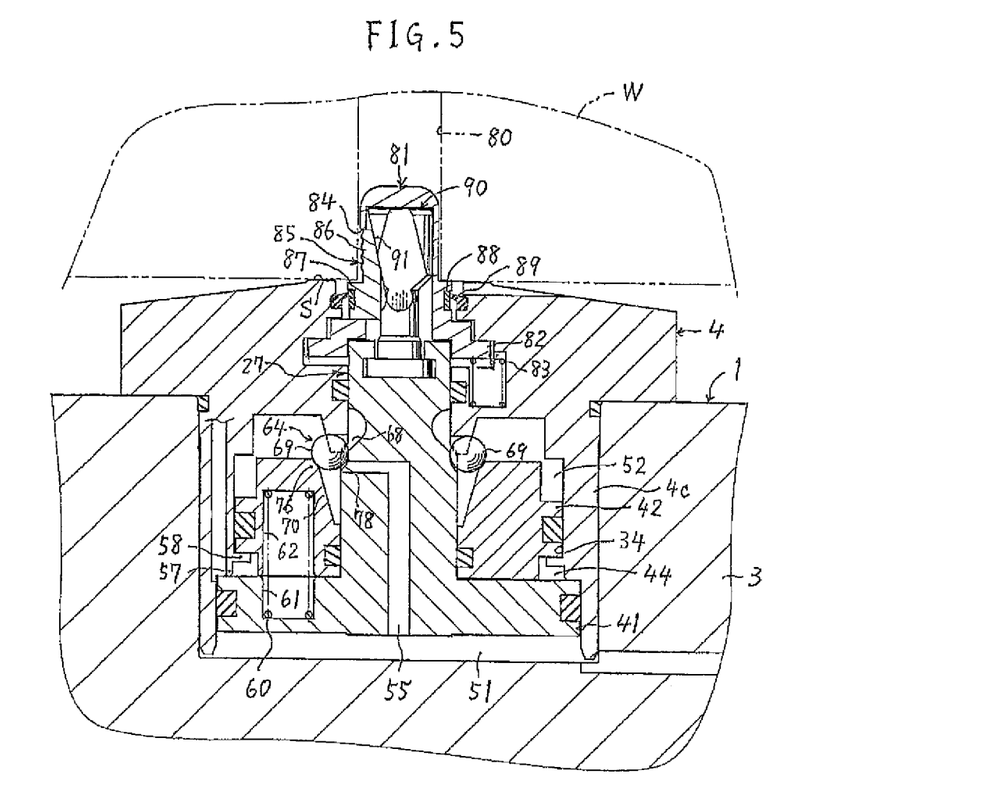
FIG. 5, which is similar to FIG. 2, illustrates a clamping system according to Embodiment 2.

FIG. 5 illustrates Embodiment 2 of the present invention, and is similar to FIG. 1A. Embodiment 2 will describe members identical (or similar) to those of Embodiment 1 by giving, in principal, identical reference numbers.

Embodiment 2 will discuss an example case where the present invention is applied to a system in which a workpiece W is clamped with the use of a hole 80 of the workpiece W. A cylinder device of Embodiment 2 is substantially identical to but differs from that of Embodiment 1 in a mechanism for clamping a workpiece W.

A bottom flange 82 of a cap 81 is inserted in an upper part of a housing 4 so as to be movable horizontally and vertically. The cap 81 is biased upward by a plurality of springs 83 (only one of which is illustrated in FIG. 5).

A plurality of guide holes 84 (only one of which is illustrated in FIG. 5) penetrate a circumferential wall of an upper half of the cap 81, in a circumferential direction at predetermined intervals. Push members 85 are inserted in the respective plurality of guide holes 84 so as to be movable horizontally. Each of the push members 85 has (i) a grip part 86 for pushing the inner circumferential surface of the hole 80 and (ii) a base 87 received by an upper surface of the bottom flange 82.

A belt-shaped elastic member 88, made of a material such as rubber, is attached to an outer circumference of the base 87 of each of the push members 85. The elastic member 88 biases each of the push members 85 toward an axis of the cap 81. Note that a lip part of a scraper 89 is in contact with an outer circumferential surface of the elastic member 88.

The push members 85 can be moved outward in a radial direction by a tapered surface 91 of a pull rod 90. A lower part of the pull rod 90 is fitted on an upper part of an output rod 27 so as to be movable horizontally.

The clamping system having such a configuration operates as below.

In a case where the cylinder device is subjected to lock driving, (i) compressed air is discharged from a first release chamber 51 and a second release chamber 52 and (ii) compressed air is supplied into a lock chamber 44, in a release state illustrated in FIG. 5. As in Embodiment 1, the compressed air in the lock chamber 44 causes the output rod 27 to move downward with a low load, via a first piston 41. Then, a press portion 76 of a second piston 42 pushes out engaging balls 69 toward respective wedge spaces (see wedge spaces 68 in FIG. 3B), so that force multiplication driving is started. Subsequently, a force-multiplying portion 70 of the second piston 42 strongly pushes the engaging balls 69 inward in the radial direction.

This causes an upward thrust acting on the second piston 42 to be subjected to force multiplication via the force-multiplying portion 70, the engaging balls 69, and the like. On this account, a downward thrust is generated, so that the output rod 27 is driven downward. Accordingly, a resultant force of (i) a downward force due to a force multiplier 64 and (ii) a downward force due to the first piston 41 causes the output rod 27 to be strongly driven downward (high-load stroke).

During such force multiplication driving, the tapered surface 91 of the pull rod 90 pushes out the push members 85 outward in the radial direction. This causes (i) the grip part 86 of each of the push members 85 to be in contact with the inner circumferential surface of the hole 80 of the workpiece W and (ii) the workpiece W to be pulled down while the grip part 86 is being in contact with the inner circumferential surface of the hole 80. Consequently, the workpiece W is strongly pressed against a support surface S at an upper end of the housing 4.

In a case where the cylinder device is switched from the lock state to a release state illustrated in FIG. 5, the first piston 41, having a larger diameter, causes the pull rod 90 to strongly move upward, via the output rod 27. It is therefore possible to absolutely release taper-engagement between the tapered surface 91 of the pull rod 90 and inner circumferential surfaces of the push members 85.

Note that, according to Embodiment 2, separate depressions 78 described in Embodiment 1 can also be omitted as in the modification illustrated in FIG. 4.

The above Embodiments and the modifications can be further modified as below.

The first release chamber 51 can be configured such that a return spring is provided in the first release chamber 51, in addition to a configuration in which a pressurized fluid for releasing is supplied into and discharged from the first release chamber 51. The second release chamber 52 can be also similarly configured.

Instead of the communicating passage 55 provided in the output rod 27, the first release chamber 51 and the second release chamber 52 can be communicated with each other via a communicating passage provided in a barrel part 4c of the housing 4 or a pipe arrangement provided outside of the housing 4.

The number of the transmitting parts 67 to be provided in the circumferential direction is preferably three or four, but can be alternatively two or not less than five. Similarly, the number of the receiving portions 66 to be provided in the circumferential direction is preferably three or four, but can be alternatively two or not less than five. Furthermore, the transmitting parts 67 can be provided with no depression 74. The receiving portions 66 can also be provided with no groove 73. In this regard, the same applies to the separate depressions 78.

The first attachment holes 61 and the second attachment holes 62, each for attaching a corresponding retaining spring 60, can be alternatively formed as follows, instead of being plurally provided in the circumferential direction. Specifically, a single annular first attachment hole formed in the upper surface of the first piston 41 can be a first attachment hole 61, and a single annular second attachment hole formed in the lower surface of the second piston 42 can be a second attachment hole 62. At least one retaining spring, made up of a compression coil spring having a large diameter, is inserted in the first attachment hole and the second attachment hole.

Instead of providing the attachment holes in both of the first piston 41 and the second piston 42, the attachment holes can be provided only in the first piston 41 or the second piston 42.

Needless to say, a clamping member for clamping the work pallet 2 or the workpiece W is not limited to the illustrated lock balls 29 or the illustrated push members 85.

The output rod 27 is configured to push down, during the lock driving, the clamping member provided on an upper side of the housing 4. Instead, the output rod 27 can be configured so as to protrude more downward than the housing 4. This causes the protruding part to push down a workpiece and the like provided on a lower side of the housing 4.

The pressurized fluid for locking or releasing can alternatively be nitrogen gas or the like. Alternatively, the pressurized fluid can be a liquid such as pressure oil.

Note that the clamping device of the present invention is not limited to be applied to the clamping of a work pallet or a workpiece. The clamping device of the present invention is also applicable to clamping of a metallic die, an attachment, or the like.

Needless to say, the present invention can be modified/altered within a range that a person skilled in the art can envisage.

(Various Aspects of the Present Invention)

In order to attain the above object, a cylinder device having a force multiplier of the present invention is configured as below (see, for example, FIG. 1A to FIG. 3B (or FIG. 4) or FIG. 5).

Specifically, the cylinder device is configured so as to carry out lock driving downward with respect to an output rod 27 that is inserted in a housing 4 so as to be movable vertically. A first piston 41 is inserted in a lower part of a cylinder hole 34 formed in the housing 4, and is connected to a bottom of the output rod 27. A second piston 42 is inserted in an upper part of the cylinder hole 34, and is fitted on the output rod 27 so as to be movable vertically. A lock chamber 44 is provided between the first piston 41 and the second piston 42, and a pressurized fluid is supplied into or discharged from the lock chamber 44. A first release chamber 51 is provided below the first piston 41, and a pressurized fluid is supplied into or discharged from the first release chamber 51. A second release chamber 52 is provided above the second piston 42, and a pressurized fluid is supplied into and discharged from the second release chamber 52. A force multiplier 64 is provided in the second release chamber 52 so that (i) a force, which causes a pressurized fluid supplied into the lock chamber 44 to push the second piston 42 upward, is converted into a downward force while being subjected to force multiplication and (ii) the downward force thus converted is transmitted to the output rod 27. The force multiplier 64 includes (i) a force-multiplying portion 70 provided on the second piston 42 and (ii) a plurality of engaging balls 69 which are provided in a circumferential direction at predetermined intervals and with respect to which the force-multiplying portion 70 carries out wedged-driving inward in a radial direction. A retaining spring 60 which biases the second piston 42 upward is provided in the lock chamber 44 between the first piston 41 and the second piston 42.

The present invention brings about the following effects.

By supply of a pressurized fluid into the lock chamber provided between the first piston and the second piston, it is possible to push the first piston downward and push the second piston upward. A force, which causes the pressurized fluid in the lock chamber to push the second piston upward, is converted into a downward force via the force-multiplying portion and the engaging balls of the force multiplier, and the downward force thus converted is transmitted to the output rod. Therefore, a great upward reaction force, generated during the force multiplication driving, acts from the output rod onto the housing via the engaging balls. Thus, as a structure in which the great reaction force generated during the force multiplication driving is received, the present invention can employ a structure in which a compressive force is received, instead of a conventional structure in which a pull force is received. As a result, it is possible to simplify the receiving structure, thereby providing a small-sized cylinder device.

According to the present invention, the lock chamber, into which a pressurized fluid is supplied, is provided between the first piston and the second piston. Further, the first release chamber, into which a pressurized fluid is supplied, is provided below the first piston, and the second release chamber, into which a pressurized fluid is supplied, is provided above the second piston. Therefore, it is not necessary to provide a thick partition wall at a certain height of the housing, unlike the conventional technology. Such a housing is short and results in a smaller-sized cylinder device.

In addition, the retaining spring provided in the lock chamber between the first piston and the second piston is configured to bias the second piston upward. It follows that, in a lock state of the output rod after the output rod is subjected to the force multiplication driving, the retaining spring retains, in a wedge-engaged state, the engaging balls which have been subjected to wedged-driving. This causes the lock state of the output rod to be absolutely maintained.

Note that, according to the present invention, a lower end of the retaining spring 60 is preferably received by the first piston 41, and an upper end of the retaining spring 60 is received by the second piston 42.

Further, according to the present invention, an attachment hole 61, 62, in which the retaining spring 60 is to be inserted, is preferably formed in at least one of the first piston 41 and the second piston 42 so as to face the lock chamber 44.

In this case, it is possible to utilize, as an attachment space of the retaining spring, a depth of the attachment hole formed in the at least one of the first piston and the second piston. This allows the housing to be short and accordingly allows a smaller-sized cylinder device to be provided.

Note that the following cases are considered about the attachment hole; a case where a plurality of attachment holes are provided, in the circumferential direction, at predetermined intervals; a case where only one annular attachment hole is provided; and a case where a plurality of annular attachment holes are concentrically provided.

Further, according to the present invention, the first piston is preferably inserted in a large hole of the cylinder hole, whereas the second piston is preferably inserted in a small hole of the cylinder hole.

In this case, when the cylinder device is switched from the lock state to a release state, a pressurized fluid supplied into the first release chamber is capable of strongly release the output rod via the first piston having a larger diameter.

Furthermore, the present invention preferably has the following configuration.

That is, the output rod 27 has a low-load stroke and a high-load stroke. During the low-load stroke of the output rod 27, the housing 4 receives the second piston 42 via the engaging balls 69 so that the second piston 42 is prevented from moving upward. In a case where each of the first piston 41 and the output rod 27 moves downward by a predetermined low-load stroke in a state where the second piston 42 is prevented from moving upward, the second piston 42 carries out the force multiplication driving with respect to the output rod 27 via the engaging balls 69. In this manner, the high-load stroke is started by the output rod 27.

In this case, since the engaging balls of the force multiplier prevent the second piston from moving upward during the low-load stroke, an upward stroke of the second piston is unnecessary. This allows the housing to be shorter.

Furthermore, the present invention preferably has the following configuration.

That is, during the high-load stroke after the output rod 27 moves downward by the predetermined low-load stroke, a pressurized fluid, supplied into the lock chamber 44 between the first piston 41 and the second piston 42, carries out the force multiplication driving with respect to the output rod 27 downward via the second piston 42 and the engaging balls 69, and drives the output rod 27 downward via the first piston 41.

In this case, a resultant force of (i) a downward force due to the force multiplication driving and (ii) a downward force due to the first piston causes the output rod to be strongly driven downward.

REFERENCE SIGNS LIST

4: Housing, 27: Output rod, 34: Cylinder hole, 35: Large hole, 36: Small hole, 41: First piston, 42: Second piston, 44: Lock chamber, 51: First release chamber, 52: Second release chamber, 60: Retaining spring, 61: Attachment hole (first attachment hole), 62: Attachment hole (second attachment hole), 64: Force multiplier, 69: Engaging ball, 70: Force-multiplying portion.

The invention claimed is:

1. A cylinder device with a force multiplier, which is configured so as to carry out lock driving downward with respect to an output rod (27) that is inserted in a housing (4) so as to be movable vertically, comprising:

a first piston (41) which is inserted in a lower part of a cylinder hole (34) formed in the housing (4) and which is connected to a bottom of the output rod (27);

a second piston (42) which is inserted in an upper part of the cylinder hole (34) and which is fitted on the output rod (27) so as to be movable vertically;

a lock chamber (44), provided between the first piston (41) and the second piston (42), into which a pressurized fluid is supplied or from which the pressurized fluid is discharged;

a first release chamber (51), provided below the first piston (41), into which a pressurized fluid is supplied or from which the pressurized fluid is discharged;

a second release chamber (52), provided above the second piston (42), into which a pressurized fluid is supplied or from which the pressurized fluid is discharged;

a force multiplier (64) provided in the second release chamber (52) so that (i) a force, which causes the pressurized fluid supplied into the lock chamber (44) to push the second piston (42) upward, is converted into a downward force while being subjected to force multiplication and (ii) the downward force thus converted is transmitted to the output rod (27), the force multiplier (64) including (a) a force-multiplying portion (70) provided on the second piston (42) and (b) a plurality of engaging balls (69) which are provided in a circumferential direction at predetermined intervals and with respect to which the force-multiplying portion (70) carries out wedged-driving inward in a radial direction; and a retaining spring (60) being provided in the lock chamber (44) between the first piston (41) and the second piston (42) and biasing the second piston (42) upward.

2. The cylinder device having the force multiplier as set forth in claim 1, wherein:

a lower end of the retaining spring (60) is received by the first piston (41), and an upper end of the retaining spring (60) is received by the second piston (42).

3. The cylinder device having the force multiplier as set forth in claim 1 or 2, wherein:

an attachment hole (61, 62), in which the retaining spring (60) is to be inserted, is formed in at least one of the first piston (41) and the second piston (42) so as to face the lock chamber (44).

4. The cylinder device having the force multiplier as set forth in claim 1 or 2, wherein:

the cylinder hole (34) has a small hole (36) and a large hole (35) which is formed so as to have a larger diameter than that of the small hole (36), and the first piston (41) is inserted in the large hole (35), whereas the second piston (42) is inserted in the small hole (36).

5. The cylinder device having the force multiplier as set forth in claim 1 or 2, wherein:

the output rod (27) has a low-load stroke and a high-load stroke, during the low-load stroke of the output rod (27), the housing (4) receives the second piston (42) via the plurality of engaging balls (69) so that the second piston (42) is prevented from moving upward, and in a case where each of the first piston (41) and the output rod (27) moves downward by a predetermined low-load stroke in a state where the second piston (42) is prevented from moving upward, the second piston (42) carries out the force multiplication driving with respect to the output rod (27) via the plurality of engaging balls (69) so that the high-load stroke is started by the output rod (27).

6. The cylinder device having the force multiplier as set forth in claim 1 or 2, wherein:

during a high-load stroke after the output rod (27) moves downward by a predetermined low-load stroke, the pressurized fluid, supplied into the lock chamber (44) between the first piston (41) and the second piston (42), carries out the force multiplication driving with respect to the output rod (27) downward via the second piston (42) and the plurality of engaging balls (69), and drives the output rod (27) downward via the first piston (41).

* * * * *